Patented Nov. 2, 1937

2,097,446

UNITED STATES PATENT OFFICE 2,097,446

PHOSPHATE-SULPHUR FERTILIZER AND PROCESS OF MAKING SAME

John T. Claiborne, Jr., New York, N. Y., and Paul D. Peterson, New Brunswick, N. J., assignors, by mesne assignments, to Freeport Sulphur Company, a corporation of Delaware No Drawing. Application December 21, 1935, Serial No. 55,564

14 Claims. (Cl. 71—33)

The present invention relates to fertilizer compositions, more particularly a fertilizer composition formed from phosphate rock and sulphur, and the process of making the same.

General objects of the invention are the provisions of such a fertilizer composition in a form which efficiently remains in an available state in soil for an unusually long period of time and allows the acid formed by gradual oxidation of the sulphur to act freely with the surrounding phosphate without interference with soil bases; and an efficient, simple, unusually cheap and readily practiced process of making the fertilizer composition.

A more specific object of the invention is the provision of such a composition in pellet form efficiently resistant to fracture wherein each pellet, which is preferably porous, constitutes a mass of phosphate particles bound together by fused sulphur distributed throughout the interior of the pellet, and an efficient and simple process whereby molten sulphur is mixed with phosphate rock particles to bind them together and the resultant mixture is readily subdivided into particles by pelletizing while the sulphur is in the molten state.

Other objects of the invention will in part be obvious and will in part appear hereinafter.

The invention accordingly comprises the several steps and the relation of one or more of such steps with respect to each of the others, and the product possessing the features, properties, and the relation of constituents, which are exemplified in the following detailed disclosure, and the scope of the invention will be indicated in the claims.

In accordance with the present invention phosphate rock particles are mixed with molten sulphur and the resultant mixture is pelletized to form pellets with sulphur binding the phosphate rock particles together. This is preferably accomplished by pouring or spraying molten sulphur into a mass of finely divided and preferably preheated phosphate rock particles of a size that will pass through a screen of 20 mesh or more, preferably about 100 mesh for obtaining a greater contact surface between the phosphate rock particles and the sulphur. The mixture is then stirred in any suitable mixer of proper design and is subdivided into particles by pelletizing while the sulphur is in a molten state.

The amount of sulphur preferably constitutes between about 20 and 30 per cent of the mixture so that porous pellets are obtained. Although this is the preferred range of the amount of sulphur, with the use of improved mixing equipment it may be possible in the practice of the present invention to lower the amount of sulphur, for example, to amounts as low as 10 or 15 per cent. Amounts of sulphur greater than 20 to 30 per cent may also be used in the production of pelletized phosphate-sulphur fertilizer when porosity is of less importance than other features. Such a composition having a high percentage of sulphur, e. g. 50 per cent or more, would be useful as a soil amendment in the treatment of alkaline soils, the excess sulphur being oxidizable into sulphuric acid for making the soil less alkaline and thus more suitable for plant growth.

The mixture is pelletized by passing it while the sulphur is in a molten state through apertures of a suitable device such as an extruding device, or a screen of relatively large mesh, e. g. about 8 mesh. It has been found that if the mixture while the sulphur is in a molten state is passed through such apertures at the temperature of the dark viscous stage of the sulphur, e. g. between about 160° C. and 260° C., preferably at a temperature between about 220° C. and 260° C., the mixture will, as it emerges from the apertures, break up into pellets. As sulphur is heated to increasing temperatures it melts forming a pale-yellow, mobile liquid and then undergoes further changes. When the melted sulphur is heated until a temperature of from about 156° C.–162° C. is reached the pale-yellow, mobile liquid suddenly becomes dark red in color and so viscous that it can be poured out of the vessel only with difficulty, if at all. Beyond 260° C. the viscidity becomes noticeably less. Reference is made to lines 14 to 18 inclusive, page 369 of Inorganic Chemistry by Alex Smith, published in 1910 by The Century Co., New York, and to lines 1 to 5 inclusive, page 382 of Treatise on Chemistry by Roscoe and Schorlemmer, Vol. 1, published in 1911 by Macmillan and Co., Ltd., St. Martin's St., London. The temperature of the dark viscous stage of molten sulphur thus varies from about 160° C. to about 260° C. Obviously after forming the mixture it may be allowed to cool and then be reheated and pelletized at the temperature of the dark viscous stage of the sulphur but preferably pelletizing is done immediately after the molten sulphur is added to the phosphate rock particles with suitable temperature control so that heat may be conserved.

Any suitable procedure for forming a mixture of phosphate rock particles and molten sulphur may be practiced in accordance with the present invention. Elemental sulphur in any of its several forms may be mixed with phosphate rock particles and eventually brought to the molten state by the application of heat or pressure or both. Sulphur at the point of production as it flows in the molten state from the mine, or from a retort, may be mixed with phosphate rock particles thereby conserving heat which is normally wasted. Thus the fertilizer composition may be made in sulphur mining localities at an unusually low manufacturing cost. The mass of phosphate rock particles may be preheated or not as desired. If heated to a relatively high temperature, say 1,000° C. or higher before the molten sulphur is added thereto some of the phosphate will be released to be present in the fertilizer mixture in a form immediately available to plants.

In the pellet form the fertilizing composition avoids the tendency of being carried away by water, currents of air, etc. when applied to the soil, although by appropriate selection of the percentage of sulphur used a porous pellet is formed. It remains in an available state in the soil for unusually long periods of time and as the sulphur is oxidized to acid the latter is free to react with the surrounding phosphate without interference from soil bases. By pelletizing at the temperature of the dark viscous stage of the sulphur, pellets are produced which are highly resistant to fracture.

It will thus be seen that the present invention efficiently attains the objects set forth above since certain changes in carrying out the above process, and certain modifications in the composition which embody the invention may be made without departing from its scope, it is intended that all matter contained in the above description shall be interpreted as illustrative and not in a limiting sense.

In the claims the term "fused" is used in the sense that the previously melted sulphur has solidified around the phosphate rock particles and it is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent, is:

1. The method of making a phosphate-sulphur fertilizer comprising mixing molten sulphur with phosphate rock particles and pelletizing the mixture at a temperature between about 220° C. and 260° C.

2. The method of making a phosphate-sulphur fertilizer comprising mixing molten sulphur with phosphate rock particles and pelletizing the mixture at the temperature of the dark viscous stage of molten sulphur.

3. The method of making a phosphate-sulphur fertilizer comprising mixing molten sulphur with phosphate rock particles of a size which will pass through a twenty mesh screen and pelletizing the mixture at a temperature between about 220° C. and 260° C.

4. The method of making a phosphate-sulphur fertilizer comprising mixing molten sulphur with phosphate rock particles of a size which will pass through a hundred mesh screen and pelletizing the mixture at a temperature between about 220° C. and 260° C.

5. The method of making a phosphate-sulphur fertilizer comprising mixing molten sulphur with phosphate rock particles and passing the mixture at a temperature between about 220° C. and 260° C. through apertures to form pellets.

6. The method of making a phosphate-sulphur fertilizer comprising mixing molten sulphur with preheated phosphate rock particles and passing the mixture at a temperature between about 220° C. and 260° C. through apertures to form pellets.

7. The method of making a phosphate-sulphur fertilizer comprising mixing molten sulphur with phosphate rock particles and passing the mixture at a temperature between about 220° C. and 260° C. through a screen of about eight mesh to form pellets.

8. The method of making a phosphate-sulphur fertilizer comprising mixing molten sulphur with phosphate rock particles of a size which will pass through a twenty mesh screen and passing the mixture at a temperature between about 220° C. and 260° C. through a screen of about eight mesh to form pellets.

9. The method of making a phosphate-sulphur fertilizer comprising mixing molten sulphur with preheated phosphate rock particles to form a mixture including between about twenty and thirty per cent sulphur and pelletizing the mixture at a temperature between about 220° C. and 260° C.

10. The method of making a phosphate-sulphur fertilizer comprising mixing molten sulphur with phosphate rock particles to form a mixture including between about twenty and thirty per cent sulphur and pelletizing the mixture at a temperature between about 220° C. and 260° C.

11. The method of making a phosphate-sulphur fertilizer comprising mixing molten sulphur with phosphate rock particles which will pass through a twenty mesh screen to form a mixture including between about twenty and thirty per cent sulphur and passing the mixture at a temperature between about 220° C. and 260° C. through apertures to form pellets.

12. The method of making a phosphate-sulphur fertilizer comprising mixing molten sulphur with phosphate rock particles which will pass through a twenty mesh screen to form a mixture including between about twenty and thirty per cent sulphur and passing the mixture at a temperature between about 220° C. and 260° C. through a screen of about eight mesh to form pellets.

13. The method of making a phosphate-sulphur fertilizer comprising mixing molten sulphur with tricalcium phosphate material and pelletizing the mixture at the temperature of the dark viscous stage of molten sulphur.

14. The method of making a phosphate-sulphur fertilizer comprising mixing sulphur as it flows from the mine in the molten state with tricalcium phosphate material and passing the mixture at the temperature of the dark viscous stage of molten sulphur through apertures to form pellets.

JOHN T. CLAIBORNE, Jr.
PAUL D. PETERSON.